(12) United States Patent
Bobrek

(10) Patent No.: US 7,187,563 B1
(45) Date of Patent: Mar. 6, 2007

(54) DC/DC CONVERTER WITH MULTIPLE MUTUALLY-ISOLATED POWER SOURCES

(75) Inventor: Pavlo Bobrek, Brandenton, FL (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 10/874,445

(22) Filed: Jun. 23, 2004

(51) Int. Cl.
*H02M 3/335* (2006.01)
*H02J 1/10* (2006.01)

(52) U.S. Cl. .............................. 363/21.01; 363/21.07; 363/21.15

(58) Field of Classification Search ................. 363/16, 363/20, 21.01, 21.04, 21.06, 21.07, 21.12, 363/12.14, 21.15, 65, 71
See application file for complete search history.

(56) References Cited

U.S. PATENT DOCUMENTS

| | | | | |
|---|---|---|---|---|
| 5,602,726 A | | 2/1997 | Sakai | 363/55 |
| 5,751,560 A | * | 5/1998 | Yokoyama | 363/18 |
| 5,838,556 A | * | 11/1998 | Yokoyama | 363/21.15 |
| 5,862,041 A | * | 1/1999 | Martin | 363/71 |
| 6,108,219 A | * | 8/2000 | French | 363/23 |
| 6,166,923 A | * | 12/2000 | Rehm et al. | 363/19 |
| 6,490,277 B1 | | 12/2002 | Tzotzkov | 370/360 |
| 6,614,666 B1 | * | 9/2003 | Chen et al. | 363/20 |
| 6,614,671 B2 | * | 9/2003 | Thrap | 363/67 |
| 6,650,028 B1 | | 11/2003 | Cornelius | 307/87 |
| 6,738,268 B1 | | 5/2004 | Sullivan et al. | 363/49 |
| 6,764,343 B2 | * | 7/2004 | Ferentz | 439/620 |
| 6,856,283 B2 | | 2/2005 | Jacobson et al. | 342/368 |
| 6,862,200 B2 | | 3/2005 | Sullivan et al. | 363/65 |
| 6,873,138 B2 | | 3/2005 | Jacobson | 323/235 |

* cited by examiner

*Primary Examiner*—Matthew V. Nguyen
(74) *Attorney, Agent, or Firm*—BainwoodHuang

(57) ABSTRACT

An electronic circuit includes a first power source, a second power source, a load, and a converter connected to each power source and the load. The converter has (i) a first oscillator circuit connected to the first power source, (ii) a second oscillator circuit connected to the second power source, the first and second oscillator circuits being electrically isolated from each other, (iii) an isolation transformer which includes a first primary winding connected to the first oscillator circuit, a second primary winding connected to the second oscillator circuit, and a secondary winding coupled to the first and second primary windings by magnetic inductance, and (iv) a rectifier circuit connected to the second winding and the load.

21 Claims, 4 Drawing Sheets

DC/DC CONVERTER WITH MULTIPLE MUTUALLY-ISOLATED POWER SOURCES

BACKGROUND

In general, a DC/DC converter accepts a direct current input at an input voltage level and converts that input into a direct current output at an output voltage level. A typical DC/DC converter includes an oscillator, a transformer, a rectifier and a feedback path. The transformer includes a primary winding which connects to the oscillator, and a secondary winding which connects to the rectifier. The feedback path includes a first portion which connects to the rectifier, and a second portion which connects to the oscillator thus providing a control loop for controlling the oscillator.

During operation, the oscillator receives the direct current input at the input voltage level and converts the input into an alternating current which passes through the primary winding (e.g., "the oscillator chops the input"). Due to magnetic coupling between the primary and secondary windings of the transformer, the alternating current through the primary winding causes a corresponding alternating current to flow through the secondary winding. The rectifier rectifies this corresponding alternating current into the direct current output at the output voltage level. The feedback path provides adjustments back to the oscillator to ensure that the DC/DC converter outputs the proper output voltage level.

There are some situations in which it is desirable for the DC/DC converter to provide electrical isolation between the oscillator and the rectifier. One conventional DC/DC converter with such a feature uses a special transformer called an isolation transformer where the primary winding and the secondary winding are electrically isolated from each other, i.e., the primary winding and the secondary windings do not share a common electrical connection. This DC/DC converter further uses an optocoupler as the feedback path. The optocoupler converts an input electrical signal from the rectifier side of the DC/DC converter to a light signal and then converts the light signal into an electrical output signal on the oscillator side thus maintaining electrical isolation between the oscillator side and rectifier side of the DC/DC converter.

SUMMARY

The above-described conventional DC—DC converter is limited to obtaining power from a single primary power source. In many cases it is desirable to obtain power from two or more, necessarily-isolated primary power sources. One motivation for using independent power sources is to enhance system reliability. In this case, the independent power sources may be isolated to prevent propagation of failures between them caused by power surges or a power-to-ground short. One conventional solution involves using mechanical or solid-state relays to select the primary source that supplies power to the oscillator and primary winding of the isolation transformer. Unfortunately, high-current relays are often too space-consuming. In other cases, it is desirable to share the power available from independent isolated primary sources, in which case, a relay is unsuitable.

In contrast to the above-described conventional DC/DC converters, embodiments of the invention are directed to powering techniques which utilize a DC/DC converter configured to provide electrical isolation to multiple power sources without the use of relays. The use of such a DC/DC converter enables multiple power sources to connect to the DC/DC converter (e.g., for fault tolerance, for power sharing, etc.) while enabling the power sources to remain electrically isolated from each other. Accordingly, the DC/DC converter is well-suited for certain applications that use multiple power sources (e.g., where an auxiliary power source operates in response to a power-to-ground short in a main power source).

One embodiment of the invention is directed to an electronic circuit (e.g., a data communications device) which includes a first power source (e.g., a power supply connected to a main power feed), a second power source (e.g., a battery backup), a load (e.g., a set of line cards configured to perform data communications operations), and a converter connected to each of the first power source, the second power source and the load. The converter has (i) a first oscillator circuit connected to the first power source, (ii) a second oscillator circuit connected to the second power source, the first and second oscillator circuits being electrically isolated from each other, (iii) an isolation transformer which includes a first primary winding connected to the first oscillator circuit, a second primary winding connected to the second oscillator circuit, and a secondary winding coupled to the first and second primary windings by magnetic inductance, and (iv) a rectifier circuit connected to the second winding and the load. Such an embodiment is well-suited for particular applications such as a network switch device which is configured to provide phantom power to powered devices (PDs) in accordance with the IEEE 802.3af standard.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to powering techniques which utilize a DC/DC converter that is configured to provide electrical isolation to multiple power sources without the use of relays. The use of such a DC/DC converter enables multiple power sources to connect to the DC/DC converter (e.g., for fault tolerance, for concurrently providing power from multiple power sources, etc.) while enabling the power sources to remain electrically isolated from each other. Accordingly, the DC/DC converter is well-suited for certain applications that use multiple power sources (e.g., where an auxiliary power source operates in response to a power-to-ground short in a main power source).

Figure 1:
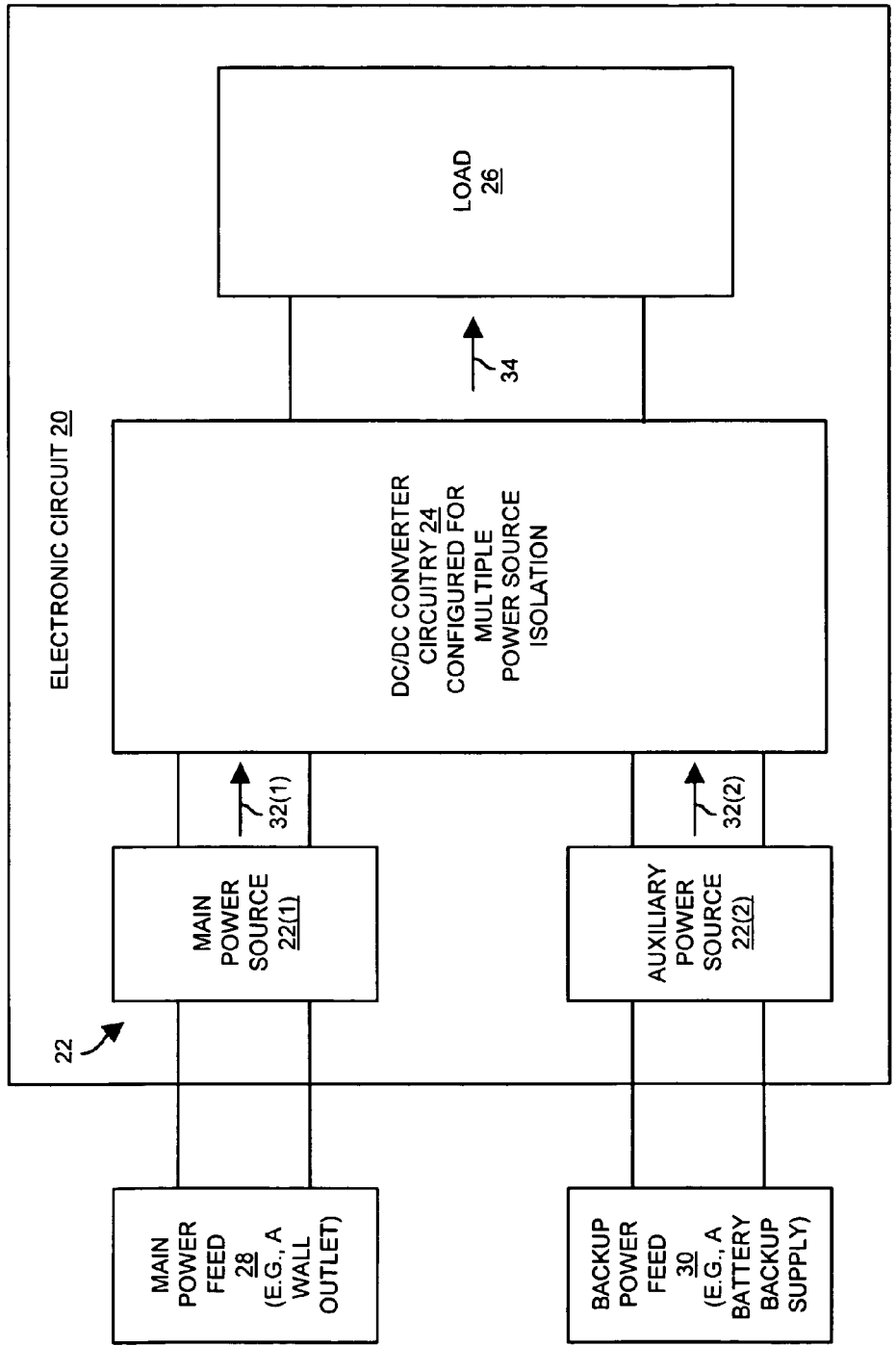
FIG. 1 is a block diagram of an electronic circuit which is suitable for use by the invention.

FIG. 1 shows an electronic circuit 20 which is suitable for use by the invention. The electronic circuit 20 includes multiple power sources 22, DC/DC converter circuitry 24 and a load 26. By way of example only, there are two power sources 22, namely, a main power source 22(1) which connects to a main power feed 28 such as a wall outlet, and an auxiliary power source 22(2) which connects to a backup power feed 30 such as a battery backup supply.

During operation, the main power feed 28 drives the main power source 22(1). As a result, the main power source 22(1) provides a direct current input 32(1) to the DC/DC converter circuitry 24 causing the DC/DC converter circuitry 24 to provide a direct current output 34 to the load 26. Additionally, the backup power feed 30 is configured to drive the auxiliary power source 22(2) in the event that the direct current input 32(1) becomes unavailable to the DC/DC converter circuitry 24 (e.g., due to a power outage, due to failure of the main power source 22(1), etc.). That is, if the DC/DC converter circuitry 24 loses access to the direct current input 32(1), the DC/DC converter circuitry 24 has access to another direct current input 32(2) from operation of the backup power feed 30 and the auxiliary power source 22(2) for fault tolerance.

It should be understood that other power source configurations are suitable for use as well. In one alternative arrangement, multiple concurrently operating power sources 22 connect to redundant main power feeds 30 (e.g., separate wall outlets on independently protected circuits) to concurrently power the load 26 (i.e., to share driving the load 26). In another alternative arrangement, a power source 22 remains on and another power source 22 turns on intermittently for augmented power contribution. In yet another alternative arrangement, the electronic circuit 20 is adapted to receive power through the main power source 22(1) in one situation (e.g., a moderate-power demand setting), and through the auxiliary power source 22(2) in a different situation (e.g., a high-power demand setting) thus enabling an equipment manufacturer to implement the same electronic circuit design in multiple power-demand settings. Other arrangements are suitable as well.

As shown in FIG. 1, the electronic circuit 20 is configured to maintain electrical isolation between the power sources 22. In particular, the DC/DC converter circuitry 24 provides multiple power source isolation for enhanced safety. As will be explained in further detail shortly, one technique for accomplishing this is by employing multiple electrically isolated oscillator circuits and multiple primary windings within the DC/DC converter circuitry 24. Accordingly, a failure of one of the power sources 22 (e.g., a power-to-ground short in the power source 22, a loss of the main power feed 28, etc.) does not affect the operation of another other power source 22. Thus, the electronic circuit 20 enjoys improved fault tolerance over conventional circuits which do not allow for multiple power source isolation. Further details will now be provided with reference to FIG. 2.

Figure 2:
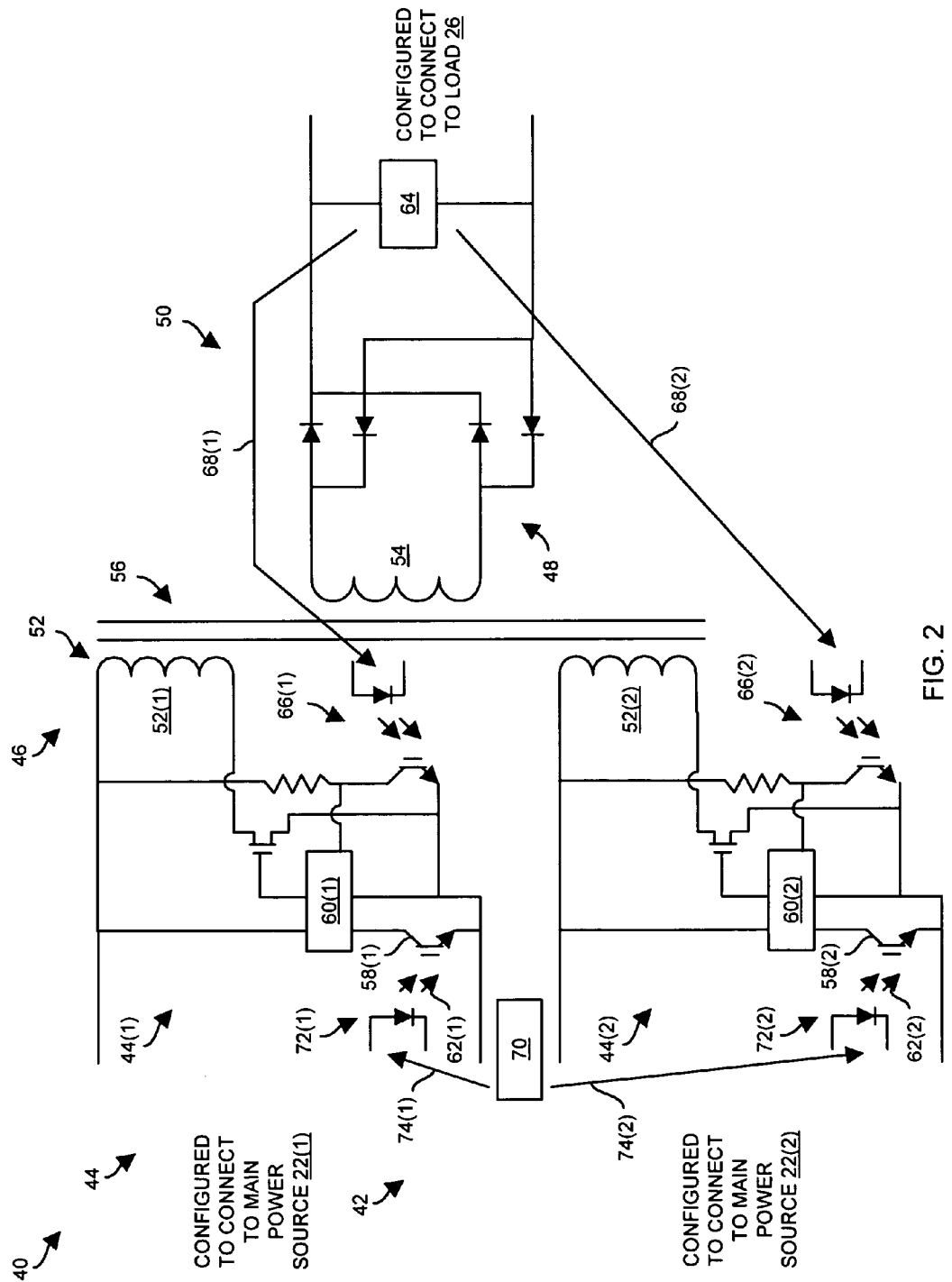
FIG. 2 is a block diagram of a DC/DC converter of the electronic circuit of FIG. 1.

FIG. 2 is a block diagram of a DC/DC converter circuit 40 which is suitable for use as the DC/DC converter circuitry 24 of FIG. 1. The DC/DC converter circuit 40 includes a controller 42, a set of oscillator circuits 44, an isolation transformer 46, a rectifier circuit 48, and a feedback mechanism 50.

The isolation transformer 46 is configured to support multiple power source isolation. In particular, the isolation transformer 46 includes a set of primary windings 52 and a secondary winding 54. Each primary winding 52 is magnetically coupled to the secondary winding 54, e.g., through a magnetic core 56 which is common to each primary winding 52. However, the primary windings 52 are electrically isolated from each other, and are further electrically isolated from the secondary winding 54.

By way of example only, the isolation transformer 46 includes two primary windings 52(1), 52(2), and the set of oscillator circuits 44 includes two oscillator circuits 44(1), 44(2) which correspond to the two primary windings 52(1), 52(2). This configuration makes the DC/DC converter circuit 40 well-suited for use as the DC/DC converter circuitry 24 of the electronic circuit 20 (FIG. 1). Nevertheless, it should be understood that the DC/DC converter circuit 40 is capable of using other numbers of primary windings 52 and other numbers of oscillator circuits 44 (e.g., three, four, and so on).

As shown in FIG. 2, the oscillator circuit 44(1) connects to the primary winding 52(1) and is configured to connect to a power source 22 (e.g., the main power source 22(1) of FIG. 1). Similarly, the oscillator circuit 44(2) connects to the primary winding 52(2) and is configured to connect to another power source 22 (e.g., the auxiliary power source 22(2) of FIG. 1). The oscillator circuits 44 are electrically isolated from each other in order to maintain the power source isolation provided by the DC/DC converter circuit 40.

As further shown in FIG. 2, the oscillator circuit 44(1) includes an optical control input 58(1) and a modulator 60(1). The optical control input 58(1) (e.g., a phototransistor) is configured to transition between an open circuit state which disables operation of the oscillator circuit 44(1) and a closed circuit state which enables operation of the oscillator circuit 44(1) in response to an optical control signal 62(1). Additionally, the modulator 60(1) modulates a DC input from a power source 22 (e.g., see the DC input 32(1) of FIG. 1) into an alternating current through the primary winding 52(1).

Similarly, the oscillator circuit 44(2) includes an optical control input 58(2) and a modulator 60(2). The optical control input 58(2) (e.g., another phototransistor) is configured to transition between an open circuit state which disables operation of the oscillator circuit 44(2) and a closed circuit state which enables operation of the oscillator circuit 44(2) in response to an optical control signal 62(2). Furthermore, the modulator 60(2) modulates a DC input from another power source 22 (e.g., see the DC input 32(2) of FIG. 1) into an alternating current through the primary winding 52(2).

The feedback mechanism 50 includes a voltage monitor and regulator 64, and optocouplers 66(1), 66(2). The voltage monitor and regulator 64 connects to the optocouplers 66(1), 66(2) by way of electrical connections which are illustrated in FIG. 2 using respective arrows 68(1), 68(2) for simplicity. The voltage monitor and regulator 64 electrically connects to the rectifier circuit 48 and operates as an input portion of the feedback mechanism 50. The optocouplers 66(1), 66(2) respectively connect to modulators 60(1), 60(2) of the oscillator circuits 44(1), 44(2) and operate as output portions of the feedback mechanism 50. Accordingly, the feedback mechanism 50 provides multiple feedback pathways from the rectifier circuit 48 of the isolation transformer 46 to the set of oscillator circuits 44. During operation of the DC/DC converter circuit 40, the feedback mechanism 50 provides adjustments to the modulators 60(1), 60(2) of the oscillator circuits 44(1), 44(2) to control and regulate the DC output provided to the load (e.g., see the DC output 34 of FIG. 1). Use of the optocouplers 66(1), 66(2) preserves electrical isolation between the primary windings 52(1), 52(2) and the secondary winding 54 of the isolation transformer 46.

The controller 42 includes a processing circuit 70 and optical outputs 72(1), 72(2) (e.g., photodiodes). The processing circuit 70 electrically connects to the optical outputs 72(1), 72(2) by way of electrical connections which are illustrated in FIG. 2 using respective arrows 74(1), 74(2) for simplicity. The processing circuit 70 senses the availability of alternating current to the isolation transformer 46, and enables and disables portions of the DC/DC converter circuit 40 in order to properly drive the load. In particular, when the processing circuit 70 detects normal operation of the power source 22(1) and the oscillator circuit 44(1), the processing circuit 70 is configured to (i) direct the optical output 72(1) to provide the optical control signal 62(1) with a first value (e.g., light ON) to enable the oscillator circuit 44(1) and (ii) concurrently direct the optical output 72(2) to provide the optical control signal 62(2) with a second value (e.g., light OFF) to disable the oscillator circuit 44(2) (e.g., to leave the oscillator circuit 44(2) in an open circuit state). In this situation, the oscillator circuit 44(1) responds by exclusively providing alternating current through the isolation transformer 46 (i.e., through the primary winding 52(1)) to drive the load.

However, when the processing circuit 70 detects a failure of either the power source 22(1) or the oscillator circuit 44(1) (e.g., the absence of alternating current through the primary winding 52(1)), the processing circuit 70 is configured to (i) direct the optical output 72(1) to provide the optical control signal 62(1) with the second value (e.g., light OFF) to reliably disable the oscillator circuit 44(1) and (ii) concurrently direct the optical output 72(2) to provide the optical control signal 62(2) with the first value (e.g., light ON) to enable the oscillator circuit 44(2). In this situation, the oscillator circuit 44(2) responds by exclusively providing alternating current through the isolation transformer 46 (i.e., through the primary winding 52(2)) to drive the load. Due to electrical isolation between the oscillator circuits 44 and between the primary windings 52, the failure in either the power source 22(1) or the oscillator circuit 44(1) does not corrupt operation of the remaining the power source 22(2) or the remaining oscillator circuit 44(2). Moreover, since the controller 42 is optically coupled to the oscillator circuits 44(1), 44(2) rather than electrically connected to the oscillator circuits 44(1), 44(2), such optical coupling further preserves power source isolation provided by the DC/DC converter circuit 40.

It should be understood that the electrical isolation features of the DC/DC converter circuit 40 (e.g., the electrical isolation of the primary windings 52 from each other, the electrical isolation of the oscillation circuits 44 from each other, etc.) enable the DC/DC converter circuit 40 to provide robust power source isolation between multiple power sources which connect to the DC/DC converter circuit 40. Such power source isolation provides enhanced safety and flexibility which is unavailable from conventional DC/DC converters that do not have electrically isolated primary windings and electrically isolated oscillator circuits. Further details of the invention will now be provided with reference to FIG. 3.

Figure 3:
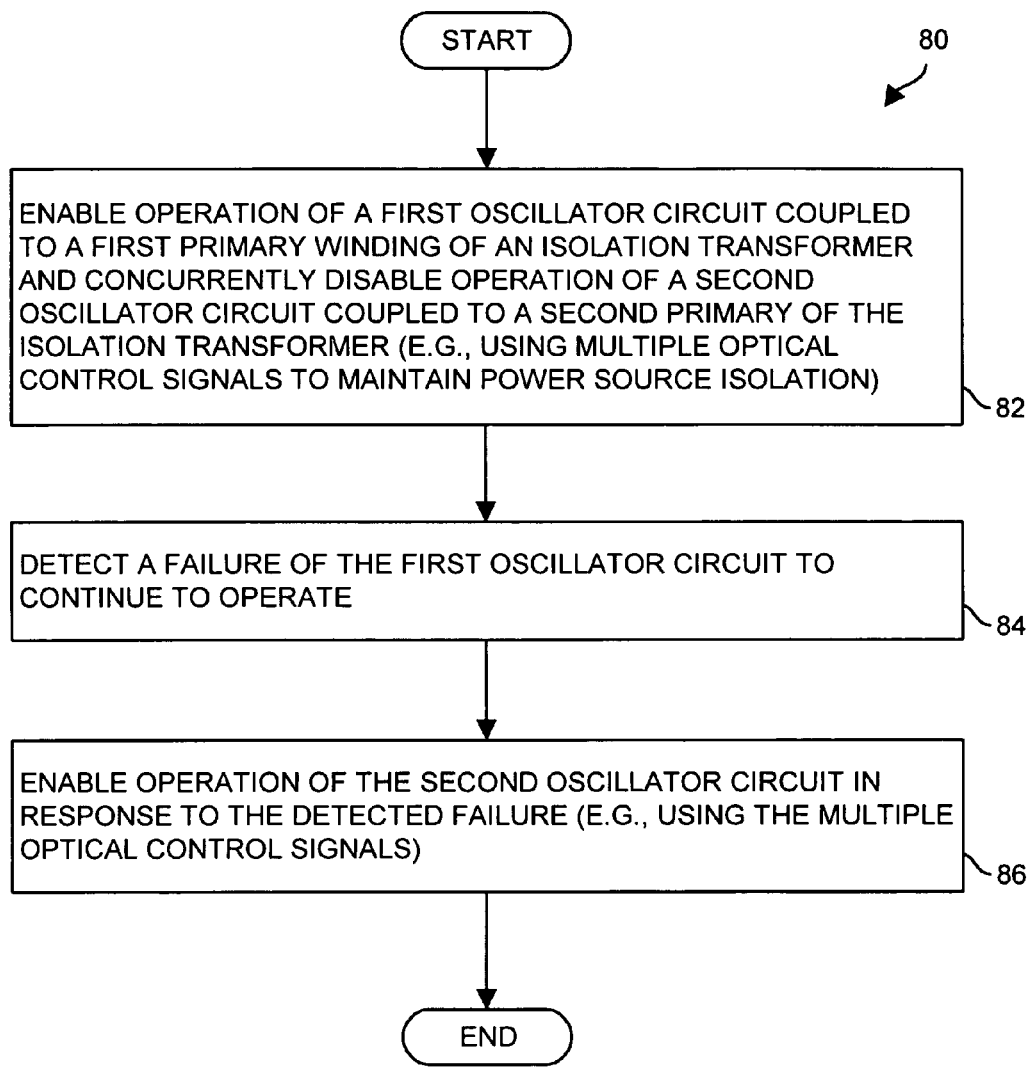
FIG. 3 is a flowchart of a procedure which is performed by a controller of the DC/DC converter of FIG. 2.

FIG. 3 is a flowchart of a procedure 80 which is performed by the controller 42 of the DC/DC converter 40 of FIG. 2. Performance of the procedure 80 is well suited for powering to a load connected to the rectifier circuit 48 when multiple power sources 22 are available.

In step 82, the controller 42 (i) enables operation of the oscillator circuit 44(1) which is coupled to the primary winding 52(1) of the isolation transformer 46 and (ii) concurrently disables operation of the oscillator circuit 44(2) which is coupled to the primary winding 52(2) of the isolation transformer 46. In particular, the controller 42 provides the optical control signals 62(1), 62(2) to enable operation of the oscillator circuit 44(1) and to disable operation of the oscillator circuit 44(2). The optical control signal 62(1) places the optical control input 58(1) into a closed circuit state, and the optical control signal 62(2) simultaneously places the optical control input 58(2) into an open circuit state. Accordingly, the load receives power through operation of only one oscillator circuit 44(1) and only one primary winding 52(1).

In step 84, the controller 42 detects a failure of the oscillator circuit 44(1) to continue to operate. Such the controller 42 is capable of detection by measuring whether there is alternating current through the primary winding 52(1). If there is no alternating current through the primary winding 52(1), a failure has occurred in either the oscillator circuit 44(1) (e.g., a failure in the modulator 60(1)) or in the power source which is configured to drive the oscillator circuit 44(1) (e.g., loss of power from a wall outlet).

In step 86, the controller 42 enables operation of the oscillator circuit 44(2) in response to the detected failure. In particular, the controller 42 provides the optical control signals 62(1), 62(2) to enable operation of the oscillator circuit 44(2) and to disable operation of the oscillator circuit 44(1). The optical control signal 62(1) places the optical control input 58(1) into an open circuit state, and the optical control signal 62(2) simultaneously places the optical control input 58(2) into a closed circuit state. Accordingly, the DC/DC converter 40 remains in operation as a whole. That is, the load now receives power through operation of the oscillator circuit 44(2) and the primary winding 52(2) which are driven by another power source while electrical isolation of the power sources is preserved for safety. Further details of the invention will now be provided with reference to FIG. 4.

Figure 4:
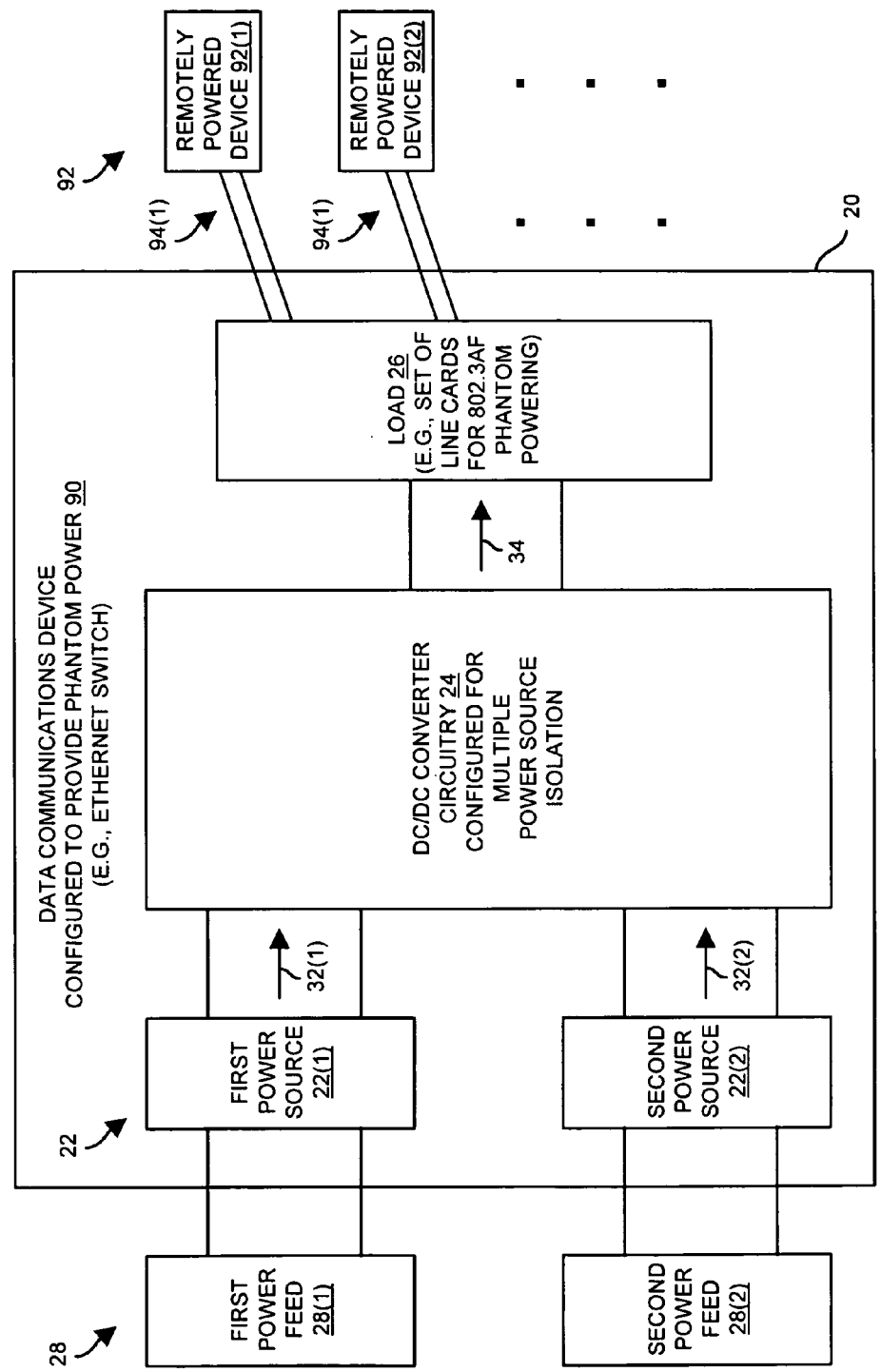
FIG. 4 is a block diagram of the electronic circuit of FIG. 1 in the context of an Ethernet switch which provided phantom power to a set of remotely powered devices.

FIG. 4 shows a specific example of the electronic circuit 20 of FIG. 1 in a network context. In particular, the electronic circuit 20 takes the form of a data communications device 90 such as an Ethernet switch which is configured to provide phantom power in accordance with the IEEE 802.3af standard, i.e., the "Power over the Ethernet" standard. As shown, the data communications device 90 includes multiple power sources 22 which enjoy electrical isolation from each other for safety. Each power source 22 has access to a power feed 28 (e.g., a wall outlet). The data communications device 90 further includes DC/DC converter circuitry 24 (also see the DC/DC converter 40 of FIG. 2) and a set of line cards as the load 26.

Each line card is configured to communicate with a remotely powered device (PD) 92 (e.g., using Ethernet communications) through a set of connections 94. For example, a remotely powered device 92(1) communicates and received power through a set of connections 94(1), a remotely powered device 92(2) communicates and received power through a set of connections 94(2), and so on.

It should be understood that there are a variety of scenarios which are suitable for the data communications device 90. In one scenario, the data communications device 90 has access to redundant power sources 22 for fault tolerance (i.e., when one power source 22 fails, the data communications device 90 uses another power source 22).

In another scenario, portions of the data communications device 90 have a single mechanical and electrical design capable of connecting to two different types of power sources 22, namely, a chassis power source (e.g., the power source 22(1)) or ancillary auxiliary power source (e.g., the power source 22(2)). In situations in which there is a relatively moderate power demand (e.g., when there are only a few PDs), the line cards are capable of being switched to obtain power from a chassis power source. On the other hand, in situations in which there is a very high power demand (e.g., in a maximum phantom powering environment), one or more of the line cards are capable of being switched to obtain power from the auxiliary power source. Accordingly, each line card is able of obtaining its power from either a chassis power source (e.g., the power source 22(1)) or ancillary auxiliary power (e.g., the power source 22(2)) and the equipment manufacturer lowers costs by using a single design. Due to the power source isolation feature of the DC/DC converter circuitry 24 (i.e., due to the electrical isolation between the oscillation circuits 44 and the primary windings 52), the line cards can safely connect to either power source 22(1), 22(2) without jeopardizing safety.

As mentioned above, embodiments of the invention are directed to powering techniques which utilize DC/DC converter circuitry 24 that is configured to provide electrical isolation to multiple power sources 22. The use of such DC/DC converter circuitry 24 enables the multiple power sources 22 to connect to the DC/DC converter circuitry 24 (e.g., for fault tolerance, for concurrently providing power from multiple power sources, etc.) while enabling the power sources 22 to remain electrically isolated from each other. Accordingly, the DC/DC converter circuitry 24 is well-suited for certain applications that use multiple power sources 22 (e.g., where an auxiliary power source operates in response to a power-to-ground short in a main power source).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data communications device, comprising:
    a first power source;
    a second power source;
    a set of line cards configured to perform data communications operations; and
    a converter connected to the first power source, the second power source and the set of line cards, the converter having:
        a first oscillator circuit connected to the first power source,
        a second oscillator circuit connected to the second power source, the first and second oscillator circuits being electrically isolated from each other,
        an isolation transformer which includes a first primary winding connected to the first oscillator circuit, a second primary winding connected to the second oscillator circuit, and a secondary winding coupled to the first and second primary windings by magnetic inductance, and
        a rectifier circuit connected to the second winding and to the set of line cards;
    wherein the first and second primary windings are electrically isolated from each other within the isolation transformer, and wherein the secondary winding is electrically isolated from each of the first and second primary windings within the isolation transformer.

2. The data communications device of claim 1 wherein the converter further has:
    an optocoupler circuit which includes an input connected to the rectifier circuit, a first output connected to the first oscillator circuit, and a second output connected to the second oscillator circuit, the first and second outputs of the optocoupler being electrically isolated from each other to maintain electrical isolation between the first and second primary windings and between the first and second oscillator circuits.

3. The data communications device of claim 1 wherein the first oscillator circuit has a first optical control input configured to receive a first optical control signal which selectively enables and disables operation of the first oscillator circuit, wherein the second oscillator circuit has a second optical control input configured to receive a second optical control signal which selectively enables and disables operation of the second oscillator circuit.

4. The data communications device of claim 3 wherein the converter further has:
    a controller configured to provide the first and second optical control signals, wherein the first oscillator circuit is configured to leave the first primary winding in an open circuit state when the first optical control signal disables operation of the first oscillator circuit, and wherein the second oscillator circuit is configured to leave the second primary winding in an open circuit state when the second optical control signal disables operation of the second oscillator circuit.

5. The data communications device of claim 4 wherein the controller of the converter includes:
    a switch that outputs the first and second optical control signals to (i) enable operation of the first oscillator circuit when disabling operation of the second oscillator circuit, and (ii) enable operation of the second oscillator circuit when disabling operation of the first oscillator circuit.

6. The data communications device of claim 1 wherein at least a portion of the set of line cards is configured to provide phantom power to an external powered device in accordance with the IEEE 802.3af standard for Ethernet communications.

7. The data communications device of claim 6 wherein the first power source is configured to connect to a main power feed, and wherein the second power source is configured to connect to a backup power feed to provide power to the set of line cards through the converter in response to a failure of the main power feed.

8. A data communications device, comprising:
    a first power source;
    a second power source;
    a set of line cards configured to perform data communications operations; and
    a converter connected to the first power source, the second power source and the set of line cards, the converter having:
        a first oscillator circuit connected to the first power source,
        a second oscillator circuit connected to the second power source, the first and second oscillator circuits being electrically isolated from each other,
        an isolation transformer which includes a first primary winding connected to the first oscillator circuit, a second primary winding connected to the second oscillator circuit, and means for coupling to the first and second primary windings by magnetic inductance, and a rectifier circuit connected to the means for coupling and the set of line cards;

wherein the first and second Primary windings are electrically isolated from each other within the isolation transformer, and wherein the means for coupling is electrically isolated from each of the first and second primary windings within the isolation transformer.

9. A converter for powering a load, the converter comprising:

a first oscillator circuit configured to connect to a first power source;

a second oscillator circuit configured to connect to a second power source, the first and second oscillator circuits being electrically isolated from each other;

an isolation transformer which includes a first primary winding connected to the first oscillator circuit, a second primary winding connected to the second oscillator circuit, and a secondary winding coupled to the first and second primary windings by magnetic inductance; and a rectifier circuit connected to the second winding and being configured to connect to the load;

wherein the first and second primary windings are electrically isolated from each other within the isolation transformer, and wherein the secondary winding is electrically isolated from each of the first and second primary windings within the isolation transformer.

10. The converter of claim 9, further comprising:

an optocoupler circuit which includes an input connected to the rectifier circuit, a first output connected to the first oscillator circuit, and a second output connected to the second oscillator circuit, the first and second outputs of the optocoupler being electrically isolated from each other to maintain electrical isolation between the first and second primary windings and between the first and second oscillator circuits.

11. The converter of claim 9 wherein the first oscillator circuit has a first optical control input configured to receive a first optical control signal which selectively enables and disables operation of the first oscillator circuit, wherein the second oscillator circuit has a second optical control input configured to receive a second optical control signal which selectively enables and disables operation of the second oscillator circuit.

12. The converter of claim 11, further comprising:

a controller configured to provide the first and second optical control signals, wherein the first oscillator circuit is configured to leave the first primary winding in an open circuit state when the first optical control signal disables operation of the first oscillator circuit, and wherein the second oscillator circuit is configured to leave the second primary winding in an open circuit state when the second optical control signal disables operation of the second oscillator circuit.

13. The converter of claim 12 wherein the controller includes:

a switch that outputs the first and second optical control signals to (i) enable operation of the first oscillator circuit when disabling operation of the second oscillator circuit, and (ii) enable operation of the second oscillator circuit when disabling operation of the first oscillator circuit.

14. A converter for powering a load, the converter comprising:

a first oscillator circuit configured to connect to a first power source;

a second oscillator circuit configured to connect to a second power source, the first and second oscillator circuits being electrically isolated from each other;

an isolation transformer which includes a first primary winding connected to the first oscillator circuit, a second primary winding connected to the second oscillator ciruciit, and means for coupling to the first and second primary windings by magnetic inductance; and a rectifier circuit connected to the means for coupling and being configured to connect to the load;

wherein the first and second primary windings are electrically isolated from each other within the isolation transformer, and wherein the means for coupling is electrically isolated from each of the first and second primary windings within the isolation transformer.

15. A method for powering a load connected to a secondary winding of an isolation transformer through a rectifier circuit, the isolation transformer further having a first primary winding and a second primary winding, the secondary winding being coupled to the first and second primary windings by magnetic inductance, the method comprising:

enabling operation of a first oscillator circuit coupled to the first primary winding of the isolation transformer and concurrently disabling operation of a second oscillator circuit coupled to the second primary winding of the isolation transformer, the first and second primary windings being electrically isolated from each other within the isolation transformer, and the secondary winding being electrically isolated from each of the first and second Primary windings within the isolation transformer;

detecting a failure of the first oscillator circuit to continue to operate; and enabling operation of the second oscillator circuit in response to the detected failure.

16. The method of claim 15 wherein enabling operation of the first oscillator circuit and concurrently disabling operation of the second oscillator circuit includes:

providing a first optical control signal to the first oscillator circuit to enable the first oscillator circuit, and a second optical control signal to the second oscillator circuit to concurrently disable the second oscillator circuit.

17. The method of claim 16 wherein providing the first and second optical control signals includes:

placing the second oscillator circuit in an open circuit state while the first oscillator circuit is in operation.

18. The method of claim 17 wherein the load is a set of line cards configured to operate in accordance with the IEEE 802.3af standard for Ethernet communications, and wherein enabling operation of the first oscillator circuit and concurrently disabling operation of the second oscillator circuit includes:

providing phantom power to a remotely powerable device in accordance with the IEEE 802.3af standard.

19. The data communications device of claim 1 wherein (i) output terminals of the first oscillator circuit connect directly to the first primary winding of the isolation transformer and (ii) output terminals of the second oscillator circuit connect directly to the second primary winding of the isolation transformer to preserve electrical isolation between the first and second primary windings.

20. The converter of claim 9 wherein (i) output terminals of the first oscillator circuit connect directly to the first primary winding of the isolation transformer and (ii) output terminals of the second oscillator circuit connect directly to the second primary winding of the isolation transformer to preserve electrical isolation between the first and second primary windings.

21. The method of claim 15 wherein (i) output terminals of the first oscillator circuit connect directly to the first primary winding of the isolation transformer and (ii) output terminals of the second oscillator circuit connect directly to the second primary winding of the isolation transformer to preserve electrical isolation between the first and second primary windings.

* * * * *